US011831673B2

(12) United States Patent
Williamson et al.

(10) Patent No.: US 11,831,673 B2
(45) Date of Patent: *Nov. 28, 2023

(54) UTILIZING ROUTING ADVERTISEMENTS TO AUTOMATE DDOS SCRUBBING TECHNIQUES IN A TELECOMMUNICATIONS NETWORK

(71) Applicant: Level 3 Communications, LLC, Broomfield, CO (US)

(72) Inventors: Todd J. Williamson, Denver, CO (US); Brent W. Smith, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,906

(22) Filed: Sep. 2, 2022

(65) Prior Publication Data

US 2022/0417280 A1  Dec. 29, 2022

Related U.S. Application Data

(63) Continuation of application No. 17/075,981, filed on Oct. 21, 2020, now Pat. No. 11,438,372, which is a (Continued)

(51) Int. Cl.
*H04L 9/40* (2022.01)
*H04L 45/02* (2022.01)
(Continued)

(52) U.S. Cl.
CPC .......... *H04L 63/1458* (2013.01); *H04L 45/02* (2013.01); *H04L 63/1416* (2013.01);
(Continued)

(58) Field of Classification Search
CPC . H04L 63/14; H04L 63/1441; H04L 63/1458; H04L 63/1466; H04L 63/16;
(Continued)

(56) References Cited

U.S. PATENT DOCUMENTS

| | | | |
|---|---|---|---|
| 2013/0044758 A1* | 2/2013 | Nguyen | H04L 45/306 370/401 |
| 2014/0283051 A1* | 9/2014 | Doron | H04L 63/1458 726/23 |

(Continued)

*Primary Examiner* — Edward Zee

(57) ABSTRACT

Aspects of the present disclosure involve systems, methods, computer program products, and the like, for an orchestrator device associated with a scrubbing environment of a telecommunications network that receives one or more announced routing protocol advertisements from a customer device under an attack. In response to receiving the announcement, the orchestrator may configure one or more scrubbing devices of the network to begin providing the scrubbing service to packets matching the received routing announcement. A scrubbing service state for the customer may also be obtained or determined by the orchestrator. With the received route announcement and the customer profile and state information, the orchestrator may provide instructions to configure the scrubbing devices of the network based on the received information to dynamically automate scrubbing techniques without the need for a network administrator to manually configure the scrubbing environment or devices.

6 Claims, 5 Drawing Sheets

Related U.S. Application Data continuation of application No. 15/956,487, filed on Apr. 18, 2018, now Pat. No. 10,819,739.

(60) Provisional application No. 62/527,542, filed on Jun. 30, 2017, provisional application No. 62/486,853, filed on Apr. 18, 2017.

(51) Int. Cl.
*H04L 45/00* (2022.01)
*H04L 29/06* (2006.01)

(52) U.S. Cl.
CPC ............ *H04L 63/205* (2013.01); *H04L 45/22* (2013.01); *H04L 63/0227* (2013.01); *H04L 63/1425* (2013.01); *H04L 63/20* (2013.01); *H04L 2463/141* (2013.01)

(58) Field of Classification Search
CPC ....... H04L 63/18; H04L 63/20; H04L 63/205; H04L 63/1416; H04L 2463/141
See application file for complete search history.

(56) References Cited

U.S. PATENT DOCUMENTS

| | | |
|---|---|---|
| 2018/0302436 A1 | 10/2018 | Williamson et al. |
| 2021/0037051 A1 | 2/2021 | Williamson |

* cited by examiner

UTILIZING ROUTING ADVERTISEMENTS TO AUTOMATE DDOS SCRUBBING TECHNIQUES IN A TELECOMMUNICATIONS NETWORK

TECHNICAL FIELD

Embodiments of the present invention generally relate to systems and methods for implementing a telecommunications network, and more specifically for utilizing routing protocol advertisements within the telecommunications network to dynamically automate scrubbing techniques in response to a distributed denial of service attack.

BACKGROUND

The Internet and the World Wide Web (the "Web") are ubiquitous and easily accessible using numerous possible devices. Content providers (publishers) now use the Internet (and, particularly, the Web) to provide all kinds of content to numerous users throughout the world. For example, television shows and movies may now be accessed from any number of Web sites, and the shows and movies may be served from the Internet. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices through one or more network connections and devices.

In some instances, content providers connected to the Internet (such as web data providers) may suffer an attack by an actor or actors to gain access to the provider's network or device or to disrupt the operation of the network or device from providing content to other users of the Internet. One such attack is known as a denial of service (DOS) attack. DOS attacks attempt to make content servers or other resources of a content provider unavailable to legitimate users by overwhelming the provider's equipment. In general, such attacks include flooding a content server or other type of device providing the content with phony requests for information from the device at such a frequency and volume to impede other legitimate traffic or requests from being fulfilled by the content server. A distributed denial of service (DDOS) attack is similar in aim except that the requests for the content are received from more than one, often thousands, of unique Internet Protocol (IP) addresses or sources. As should be appreciated, such attacks may negatively impact the ability of the customer to provide content to legitimate requesters of content or information, effectively blocking the content from being provided to requesting customers.

SUMMARY

One implementation of the present disclosure may take the form of a method for providing a scrubbing service from a network. The method may include the operations of receiving routing information, at an application server, through a first routing protocol announcement session for a device of a telecommunications network in response to a denial of service attack on the device, the routing information comprising at least one Internet Protocol (IP) address associated with the device, associating the at least one IP address with a customer profile of a scrubbing environment of the telecommunications network, the scrubbing environment providing traffic scrubbing services to the customer of the telecommunications network, and transmitting one or more instructions from the application server to the scrubbing environment to add the at least one IP address to a list of scrubbed IP addresses of at least one scrubbing device of the scrubbing environment in response to the received routing information for the device of the telecommunications network through the first routing protocol announcement session.

Another implementation of the present disclosure may take the form of an orchestrator device of a scrubbing environment of a telecommunications network. The orchestrator may include at least one communication port receiving routing information through a first routing protocol announcement in response to a detected denial of service attack on the device, the routing information comprising at least one Internet Protocol (IP) address associated with a device of the telecommunications network, a processing device, and a computer-readable medium connected to the processing device configured to store information and instructions that, when executed by the processing device, performs certain operations. Such operations may include associating the at least one IP address with a customer profile of the scrubbing environment of the telecommunications network, the scrubbing environment providing traffic scrubbing services to the customer of the telecommunications network, obtaining a customer scrubbing state of the scrubbing environment based at least on the customer profile of the scrubbing environment, the customer scrubbing state comprising an indication of a stored scrubbing state for the IP address associated with the device, and transmitting one or more instructions to the scrubbing environment to add the at least one IP address to a list of scrubbed IP addresses of at least one scrubbing device of the scrubbing environment in response to the received routing information for the device of the telecommunications network through the first routing protocol announcement.

Yet another implementation of the present disclosure may take the form of a telecommunications network. The network may include a plurality of scrubbing devices providing traffic scrubbing services to at least one customer of the telecommunications network in response to a denial of service attack on a device of the customer, a scrubbing controller providing scrubbing instructions to configure the plurality of scrubbing devices to provide the traffic scrubbing services to the at least one customer of the telecommunications network, and a scrubbing orchestrator in communication with the scrubbing controller. The scrubbing orchestrator may receive routing information through a first routing protocol announcement session for the device of the customer in response to the denial of service attack on the device, the routing information comprising at least one Internet Protocol (IP) address associated with the device, associate the at least one IP address with a customer profile, and transmit one or more instructions from the application server to the scrubbing controller to add the at least one IP address to a list of scrubbed IP addresses of at least one scrubbing device of the plurality of scrubbing devices in response to the received routing information through the first routing announcement protocol session.

DETAILED DESCRIPTION

Figure 1:
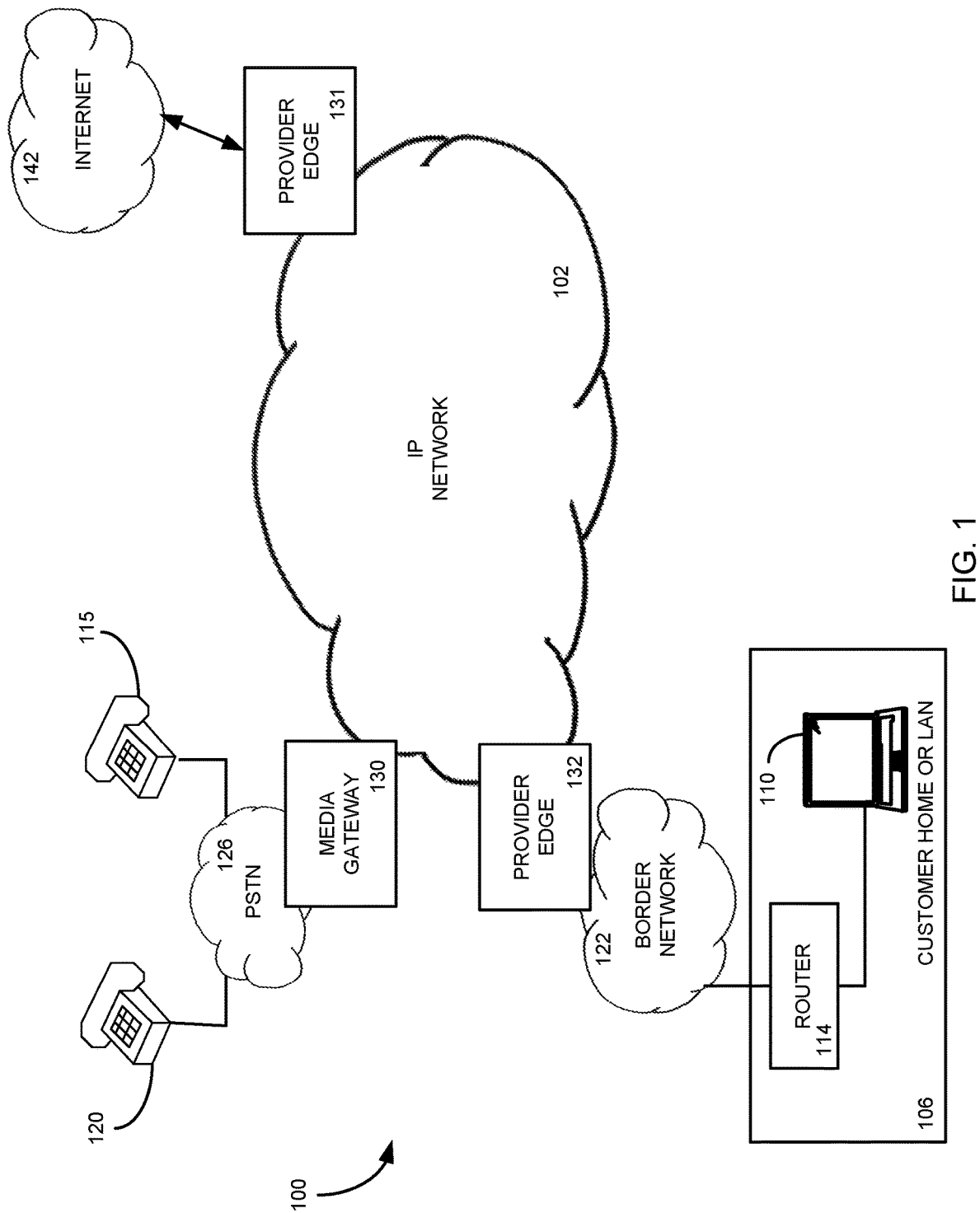
FIG. 1 schematic diagram illustrating an exemplary Voice over Internet Protocol (VoIP) operating environment in accordance with one embodiment.

Aspects of the present disclosure involve systems, methods, computer program products, and the like, for utilizing routing protocol advertisements within a telecommunications network to dynamically automate scrubbing techniques to mitigate a denial of service (DOS) or a distributed DOS (DDOS) attack (collectively referred to herein as a DDOS attack) on a web or content server hosted by a customer to the telecommunications network. In general, the telecommunications network hosts the content providing device or provides a route from a requester device to the content device. In one particular embodiment of the present disclosure, the telecommunications network provides a scrubbing environment that attempts to identify malicious packets of a DDOS attack and remove those packets before they reach the targeted customer network or device. This scrubbing service is provided to a customer upon receiving a request or purchase of the service at the network. However, it is often the case that the information associated with a customer (referred to herein as a "customer profile") that registers the customer with the scrubbing service is input or otherwise provided to the scrubbing system manually by one or more operators of the network upon receiving the request. Thus, in addition to being a time-consuming process to enter the requesting customer's information into the scrubbing environment, the scrubbing service of the network may also not be responsive in time to halt or effectively mitigate the DDOS attack to those customers whose information has not been manually added.

As such, one particular embodiment of the network may include a controller or orchestrator device or system associated with a scrubbing environment of a telecommunications network that receives one or more announced routing protocol advertisements from a customer device under a DDOS attack. In response to receiving the advertisement or announcement, the orchestrator may configure one or more scrubbing devices of the network to begin providing the scrubbing service to packets matching the received routing announcement. In addition, the orchestrator may access a database of customer information and associate the received route announcement with a particular customer. Further, a scrubbing service state for the customer (such as whether a customer profile exists on the scrubbing environment, an active or inactive state of the customer profile on the scrubbing environment, a level and type of scrubbing service provided to the customer by the scrubbing environment, etc.) may be obtained or determined by the orchestrator. With the received route announcement and the customer profile and state information, the orchestrator may provide instructions to configure the scrubbing devices of the network based on the received information. In this manner, the orchestrator may dynamically automate scrubbing techniques in response to a DDOS attack based on a received route announcement without the need for a network administrator to manually configure the scrubbing environment or devices.

In other embodiments, the orchestrator may also be configured as a route arbiter for controlling which routes through the network receive the DDOS scrubbing service provided by the telecommunications network, as well as mitigating the DDOS attack through routing decisions and announcements. In this embodiment, the orchestrator may again receive an announced route from a customer device under attack and pair that information with customer information by accessing or receiving customer information from a customer profile. In addition to providing instructions to configure the scrubbing devices of the scrubbing environment, the orchestrator may also, through a route announcement session, announce one or more routes to components of the network and/or the scrubbing environment. The announced routes from the orchestrator may further configure the scrubbing environment (or other components of the network) in response to the received route to further mitigate the DDOS attack on the customer's device. This configuration through route announcement may occur dynamically in response to a detected attack and allow for more control over the scrubbing service provided by the network on malicious network traffic. Through any embodiment, the scrubbing techniques employed by the network may be dynamically automated utilizing a routing protocol announcement associated with the customer device or network under attack to minimize or eliminate the need for an administrator to configure the network elements in response to the attack.

FIG. 1 schematic diagram illustrating an exemplary Voice over Internet Protocol (VoIP) operating environment in accordance with one embodiment. For example, the network 102 may include a scrubbing service or scrubbing environment to aid a customer to the network in mitigating a DDOS attack on the customer's network or devices. In general, the environment 100 provides for establishing communication sessions between network users and for providing one or more network services to network users. For example, access to the Internet may be provided to one or more customers of the network through the operating environment 100 discussed herein. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication and/or provides services across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device 130 or provider edge 132. For ease of instruction, only three communication devices 110, 115, 120 are shown communicating with the VoIP network 102; however, numerous such devices, and other devices, may be connected with the network, which is equipped to handle enormous numbers of simultaneous calls and/or other IP-based communications.

In one particular embodiment of the present disclosure, the border network 122 may be operated by a customer to the VoIP network 102. Further, more than one customer or border network may connect to the VoIP network 102 through a service edge 132 or media gateway 130. Each border network 122 associated with the network 102 may include any number of components and be any size to provide services to any number of customers in communication with the border network. As such, through the network 100 configuration of FIG. 1, a user 106 of the telecommunications network 102 may access the Internet 142 to obtain data or other information from a storage server of the Internet. In one particular embodiment, the storage server available through the Internet 142 may be hosted or otherwise included in a peer network to the telecommunications network 102. In other words, the storage server from which the user device 110 is communicating to receive the data may be hosted by a connected network 142 such that connection to the connected network is provided to allow the user device 110 access to the storage server.

An operator of the VoIP network 102 may configure the network in any manner to facilitate the routing of communications through the network. For example, the network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide routing information between the components of the network and between different networks so that components of the Internet and other networks may determine how to route received communication packets.

One particular example of the announcement of routing information occurs in a Border Gateway Protocol (BGP) announcement. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, as described below, BGP information mainly describes routes used by the network 102 to connect to external networks or customers (such as border networks 122, 142) while IGP information describes routes through the network to connect one provider edge (such as provider edge 132) to another provider edge (such as provider edge 131) through a telecommunications network 102.

One or more of the components of the network 102 may announce through a BGP session or other routing protocol announcement or advertisement routes serviced by that component. For example, provider edge 132 may provide a BGP announcement to other components in the network 102 that indicates which networks (such as border network 122) that may be accessed through the provider edge. Thus, the BGP announcement for provider edge 132 may include a path and next-hop information that designates a path along which packets may be transmitted or received from the connected networks (such as border network 122). The next-hop information generally identifies a particular device of the network 102 through which a destination device or address is available. For example, a particular Internet Protocol (IP) address associated with a customer of the network 102 or border network 122 that is accessible through the border network may be announced from provider edge 132 to provider edge 131 of the telecommunications network (and vice versa). Although discussed herein as BGP announcements or advertisements, it should be appreciated that the routing protocol advertisements may be either or both BGP routes between networks and IGP routes through IP network 102. The use of BGP routing in routing communications through network 102 is described in more detail below with reference to the network 202 configuration of FIG. 2.

Figure 2:
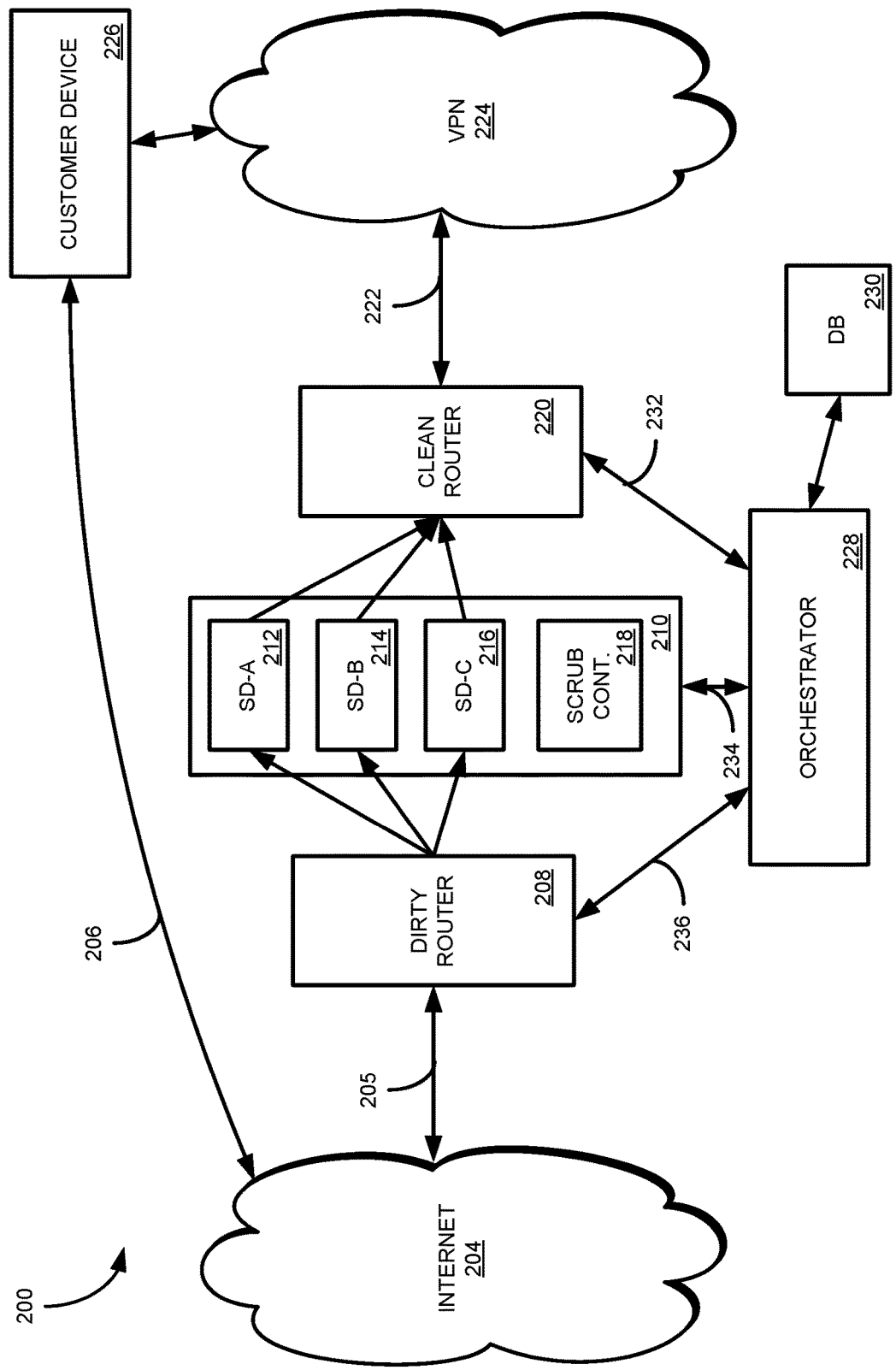
FIG. 2 is a schematic diagram illustrating an exemplary network environment for providing scrubbing services to a customer of the network during a network attack in accordance with one embodiment.

The network environment 200 illustrated in FIG. 2 provides an exemplary network environment 200 for providing scrubbing services to a customer of the network during an attack on one or more components in accordance with one embodiment. In general, the components of the network environment 200 of FIG. 2 may be incorporated or included in the telecommunications network 102 of FIG. 1. For example, so-called "dirty" router 208, scrubbing environment 210, so-called "clean" router 220, and orchestrator 228 may be included in the network 102 as part of a scrubbing or anti-attack service provided by the network 102. Although illustrated in FIG. 2, it should be appreciated that more or fewer components than those shown may also be included in the telecommunications network 102. Other components, such as customer device 226 and/or Internet 204 may form a portion of the telecommunications network 102 or may be included in other communication networks, such as Internet 142 or border network 122 of FIG. 1. Regardless of the configuration, the network environment 200 of FIG. 2 provides for a scrubbing service to a customer associated with customer device 226 during a DDOS attack to mitigate the negative effects of the attack on the customer equipment.

As shown in FIG. 2, customer device 226 may connect to the Internet 204 through communication line 206. In general, customer device 226 may be any network device, such as an application server or storage server for providing data or any other type of content to requestors through the Internet 204. As such, the connection line 206 may include any number of networking devices for routing packets between the Internet 204 and the customer device 226, such as network 102 and provider edge 131, illustrated in FIG. 1. Thus, connection line 206 may be considered a standard or typical connection between the customer device 226 and the Internet 204. Further, customer device 226 may be more than one customer network device to create a customer network of such devices for providing Internet data or content to requesting devices.

During a DDOS attack on the customer device 226 or network, the customer device or network may purchase or employ a scrubbing service provided by an IP network 102 to scrub out communication packets intended for the customer device that are identified as malicious or otherwise part of the DDOS attack. To facilitate the scrubbing service for the customer 226, the telecommunications network may utilize a scrubbing environment 210 for scrubbing or removing malicious communications intended for a customer of the network. The customer device 226 may thus detect a DDOS attack through any known or conventional method and notify the scrubbing environment 210 to begin scrubbing received packets for the device. In another embodiment, the telecommunications network 102 hosting the scrubbing environment 210 may itself detect the DDOS attack and may begin sending packets for the customer device 226 through the scrubbing service. Regardless of the device or network that detects the DDOS attack, communication packets (including requests for data) intended for the customer device 226 may be rerouted through the scrubbing service 210 to attempt to combat the DDOS attack. Generally, the scrubbing service 210 analyzes some or all packets intended for the device 226 under attack to determine which packets are legitimate and which are malicious. The malicious packets are then rerouted or dropped such that they cannot overwhelm the targeted customer device 226.

In one particular implementation of the scrubbing service of the network 102, the redirecting of communication packets through the scrubbing service 210 may be instigated through a BGP announcement or other routing protocol announcement. In particular, the customer device 226 or network may provide an IP address associated with the customer device to the Internet 204 and other connected networks through one or more BGP announcements. Traditionally, BGP announcements are provided by devices or networks to aid networks in creating routing paths to the announcing device, such as over communication path 206. Upon a DDOS attack, however, the customer device 226 may be configured to establish a new or modified BGP session with Virtual Private Network (VPN) 224 of the telecommunications network 200. In general, the VPN 224 is a virtual network that is created by and hosted through a telecommunications network, such as IP network 102. The VPN 224 acts as a border network between customer device 226 and the telecommunications network hosting the scrubbing environment 210. The routing information announced by the customer device 226 to VPN 224 may propagate through other components of the telecommunications network through other BGP sessions, such as between VPN 224 to clean router 220, from clean router to scrubbing environment 210, from scrubbing environment to dirty router 208, and from dirty router 208 to Internet 204 network. This cascading route announcement from customer device 226 in response to a detected attack through the scrubbing network 200 creates a second routing path to reach customer device from the Internet 204. In one example, the new BGP information from dirty router 208 provided to the Internet 204 over announcement 205 may include a preference value that overrides the previous BGP announced route 206. Thus, route 205 creates a bypass route for communication packets intended for the customer device 226 that are now routed through the dirty router 208 to begin the scrubbing service of the packets provided by the telecommunications network.

Upon re-routing of traffic intended for the customer device 226 along communication line 205, the dirty router 208 may transmit the potentially malicious communication packets to the scrubbing environment 210 for analysis and scrubbing. In particular, the scrubbing environment 210 may include one or more scrubbing devices (illustrated as SD-A through SD-C 212-216 in FIG. 2) and a scrubbing controller 218 to control or configure the scrubbing devices. In general, the scrubbing devices 212-216 analyze received communication packets to determine if such packets may be potentially malicious to a destination device, such as by being part of a DDOS attack, and remove or reroute such packets before reaching the customer device 226. As explained in more detail below, the scrubbing controller 218 may control the operation of the scrubbing devices 212-218, such as configuring the scrubbing devices with customer information and load balancing scrubbing services across the available scrubbing devices. The incoming stream of communication packets for the destination device 226 that is scrubbed in the scrubbing environment 210 is then transmitted to the clean router 220 which provides the cleaned stream of packets to the VPN 224. The VPN 224, in turn, transmits the cleaned stream of packets to the customer device 226 for processing by the device. In this manner, a scrubbing of the communication packets for customer device 226 may be provided through the scrubbing environment 210 to mitigate a DDOS attack on the customer device.

In general, the scrubbing devices 212-216 of the scrubbing environment 210 are provided with or otherwise have access to customer information so that the scrubbing devices are aware of IP addresses associated with a customer's devices 226, the type of scrubbing technique to apply to those packets, and other information that may configure the operation of the scrubbing devices to provide the scrubbing service. Typically, this information is manually provided to the scrubbing controller 218 or a database 230 by an administrator of the network 102 providing the service so that the controller can configure the scrubbing environment 210 accordingly. Often, however, this process can be time-consuming and may not react quickly to detected attacks on a customer's device 226. For example, a customer to the network 102 may request the scrubbing service upon the detection of a DDOS attack. During the time it takes for the network administrator to provide customer information to the scrubbing controller 218, the customer's device 226 may be down or overwhelmed. A faster response to a DDOS attack on the customer device 226 would thus lessen the impact of the attack.

Thus, in one particular implementation of the network environment 200, a scrubber orchestrator 228 may be included in the network 200 to automate the provisioning of customer information in the scrubbing environment 210 or to adjust the configuration of the scrubbing environment. In general, the orchestrator 228 may be any type of computing or networking device, such as an application server. In one implementation, the orchestrator 228 receives one or more route protocol advertisements from the customer device 226 or other network devices (such as the BGP route advertisement of the customer device 226 received at the clean router 220) and configures one or more of the scrubbing devices 212-216 or scrubbing controller 218 of the scrubbing environment 210 based on the received route protocol advertisement. This configuration of the scrubbing environment 210 may occur automatically in response to the received route information such that the scrubbing service may be provided faster and without manual entry of customer information to the scrubbing environment.

Figure 3:
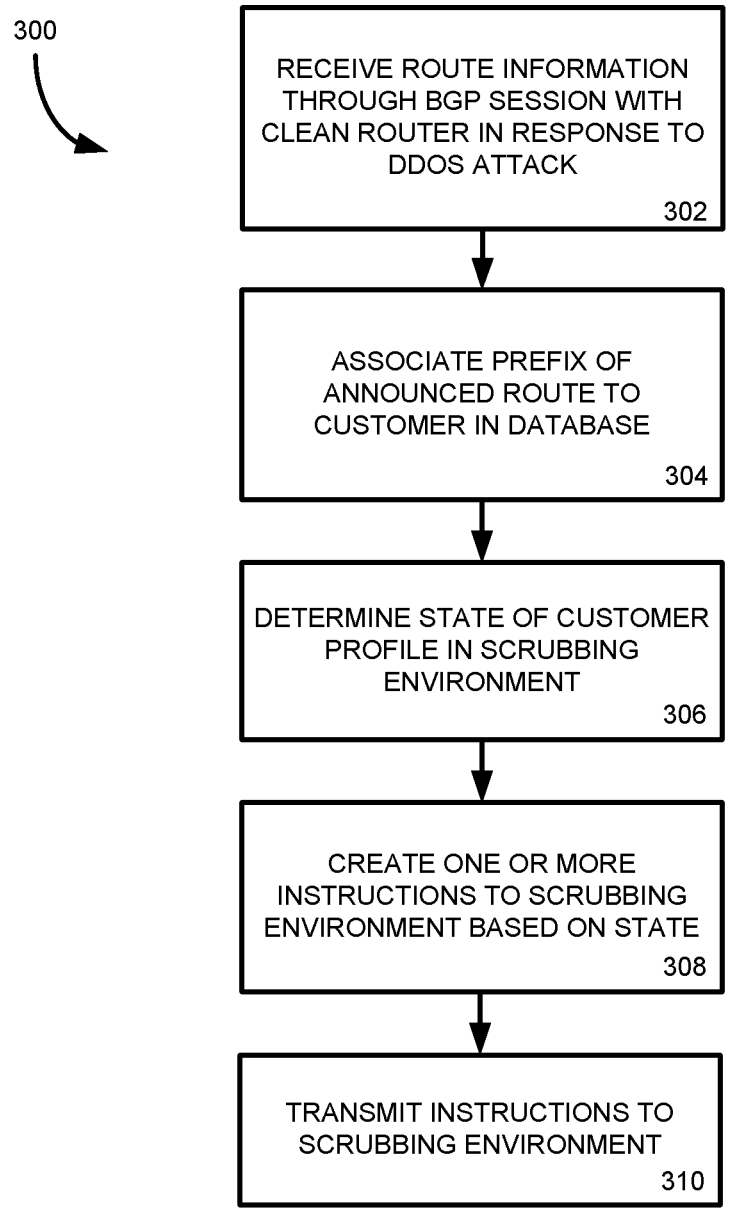
FIG. 3 is a flowchart illustrating a method for utilizing a routing protocol advertisement to dynamically automate scrubbing services in a telecommunications network.

To describe the operation and use of the orchestrator 228, reference is now made to the method 300 of FIG. 3. In particular, FIG. 3 is a flowchart illustrating a method 300 for utilizing a routing protocol advertisement to dynamically automate scrubbing services in a telecommunications network. In general, the operations of the method 300 may be performed by the orchestrator 228 device illustrated in the network configuration 200 of FIG. 2. However, one or more of the operations may be performed by other networking or computing devices. Further, the orchestrator 228 may include more than one device for executing the operations of the method 300. Through the method 300 of FIG. 3, the orchestrator 228 may configure one or more aspects of the scrubbing environment 210 to automate scrubbing services for a customer based on a routing protocol advertisement.

Beginning in operation 302, the orchestrator 228 receives routing information through a routing protocol advertisement. For example, the orchestrator 228 may receive a BGP session with routing information from the clean router 220 of the network 200 or from another device of the network. In other embodiments, the orchestrator 228 may receive the routing information from the VPN 224 or from the customer device 226 (or any other network device utilized in the network environment 200). The BGP or other routing protocol advertisement may generally include routing information for the customer device 226 in response to a detected DDOS attack on the customer device or network. As explained above, the customer device 226 or network may initiate a BGP session with connected devices in response to a DDOS attack on the device, particularly the VPN 224 of the telecommunications network. The announced route in the BGP session is configured to redirect traffic or packets intended for the customer device to be sent through the scrubbing environment 210 (i.e., route 205 instead of route 206). Thus, the route may be propagated from the VPN 224, through the clean router 220, the scrubbing environment 210, and the dirty router 208 for announcement to the Internet 204 and any Internet-related devices such that packets are rerouted toward the dirty router for scrubbing. In one embodiment, the orchestrator 228 may also receive the announced BGP routing information, such as along communication line 232 (although other devices may also communicate the routing information to the orchestrator). In one particular implementation, the announced BGP routing information may include the removal of a previously announced route to the customer device 226, potentially signifying that the DDOS attack is no longer detected and the customer device is announcing new routing information again over communication 206 to the Internet 204.

With the received routing information originating from the customer device 226, the orchestrator 228 may utilize the routing information to obtain customer information associated with the route in operation 304. For example, the routing information may include an IP address or prefix associated with the customer device 226. The orchestrator 228 may match the received prefix with a particular customer to the telecommunications network 102. In one particular embodiment, the orchestrator 228 may contact a database 230 that stores customer information, including prefixes or IP addresses associated with the customers to the network. Through the database 230, the orchestrator 228 may determine which customer to the network is associated with the announced BGP route information. In another embodiment, the orchestrator 228 may itself store customer information that may be associated with a received prefix from the router protocol announcement or advertisement. In still another embodiment, the customer information may be provided by the scrubbing controller 218 upon a request by the orchestrator 228 for the information.

In operation 306, the orchestrator 228 may determine a state of a customer's profile within the scrubbing environment 210 from the obtain customer information. For example, the orchestrator 228 may identify a particular customer to the telecommunications network from the received routing information and customer information stored in the database 230. That particular customer may or may not be registered with the network to receive scrubbing services from the telecommunications network. For example, the particular customer may not have purchased the scrubbing service from the network. Other scrubbing states of the system 210 may also be associated with the customers of the network 102. In some examples, the state of the customer profile in relation to the scrubbing environment 210 may include whether the customer is provisioned with the scrubbing environment, particular routes or IP addresses associated with the customer at the scrubbing environment, particular scrubbing techniques provided to the customer's routes, the scrubbing devices 212-216 the customer's routes are provisioned on, and the like. In general, any information associated with the customer and the scrubbing service provided to the customer may be included in the state of the customer profile.

With the determined customer state, the orchestrator 228 may create one or more calls or instructions to the scrubbing environment 210 based on the determined customer scrubbing state in operation 308 and transmit the created instructions to the scrubbing environment in operation 310. For example, the customer profile with the scrubbing environment 210 may indicate that the customer is not provisioned with the system. Thus, although the received route from the BGP session for the customer device 226 may be associated with a particular customer of the network in the database 230, that customer is not provisioned to receive a scrubbing service from the network and/or scrubbing environment 210. In this example, the orchestrator 228 may then create a customer profile or otherwise provision the customer with the scrubbing environment 210 through one or more calls or instructions transmitted to the scrubbing environment (and in particular, the scrubbing controller 218 of the environment). In one particular embodiment, the instructions or calls may be Representational State Transfer Application Programming Interface (REST API) calls. In another embodiment, the instructions or calls may be DDOS Open Threat Signaling (DOTS) calls or instructions. Regardless of the communication protocol, the instructions may be executed by the scrubbing controller 218 to create a customer profile and/or scrubbing state associated with the received route with the scrubbing environment 210 to begin providing scrubbing services to the customer.

In another example, a profile for the identified customer may already be provisioned with the scrubbing environment 210, but the received route for the customer device 226 may not be included in the customer's profile with the scrubbing environment 210. In this instance, the orchestrator 228 may add the route received through the BGP session from the customer device 226 to the customer's profile through the created and transmitted instructions to the scrubbing environment 210. In this manner, the customer device 226 may then begin to receive scrubbing services for the announced route at the scrubbing environment 210. Similarly, if a particular customer route ceases to be announced through the BGP session, the orchestrator 228 may instruct the scrubbing controller 218 to remove the route from the customer's profile with the scrubbing environment 210. Further still, if the customer profile with the scrubbing environment 210 has no routes associated with the customer for scrubbing, the orchestrator 228 may, in some embodiments, remove the customer's profile from the scrubbing environment until a new announced route for that customer is received. For example, the scrubbing devices 212-216 may be limited to a number of customer profiles that are provisioned at each of the devices such that an inactive profile or one without a route to be scrubbed may consume storage space within the scrubbing device. In such circumstances, the inactive profile may be removed so that additional profiles may be provisioned on the scrubbing devices.

In yet another example, the received route may already be associated with the scrubbing environment 210 (or the orchestrator 228) such that, upon receiving the route, the orchestrator provides instructions to the scrubbing environment to begin scrubbing packets intended for the received route. Similarly, the orchestrator 228 may provide instructions to stop scrubbing particular packets when a route associated with the customer profile is removed from the BGP announcement. In other embodiments, the instructions sent to the scrubbing controller 218 may include a load balancing feature to balance the scrubbing load for the customers of the network across the scrubbing devices 212-216. Thus, the orchestrator 228 may track which scrubbing devices 212-216 are tasked with which customer traffic or routes and load balance across the devices so that no one scrubbing device is overwhelmed with incoming packet analysis. The instructions provided by the orchestrator may also designate a type of scrubbing (such as removal of malicious packets, identification of malicious packets, remediation of malicious packets, etc.) to be applied to the routes associated with the customer at the scrubbing environment 210. In general, any feature or operation of the scrubbing environment 210 may be controlled by the orchestrator 228 in response to receiving an advertised route through a BGP session with a network device 220 and associated with a customer 226 to the network.

Figure 4:
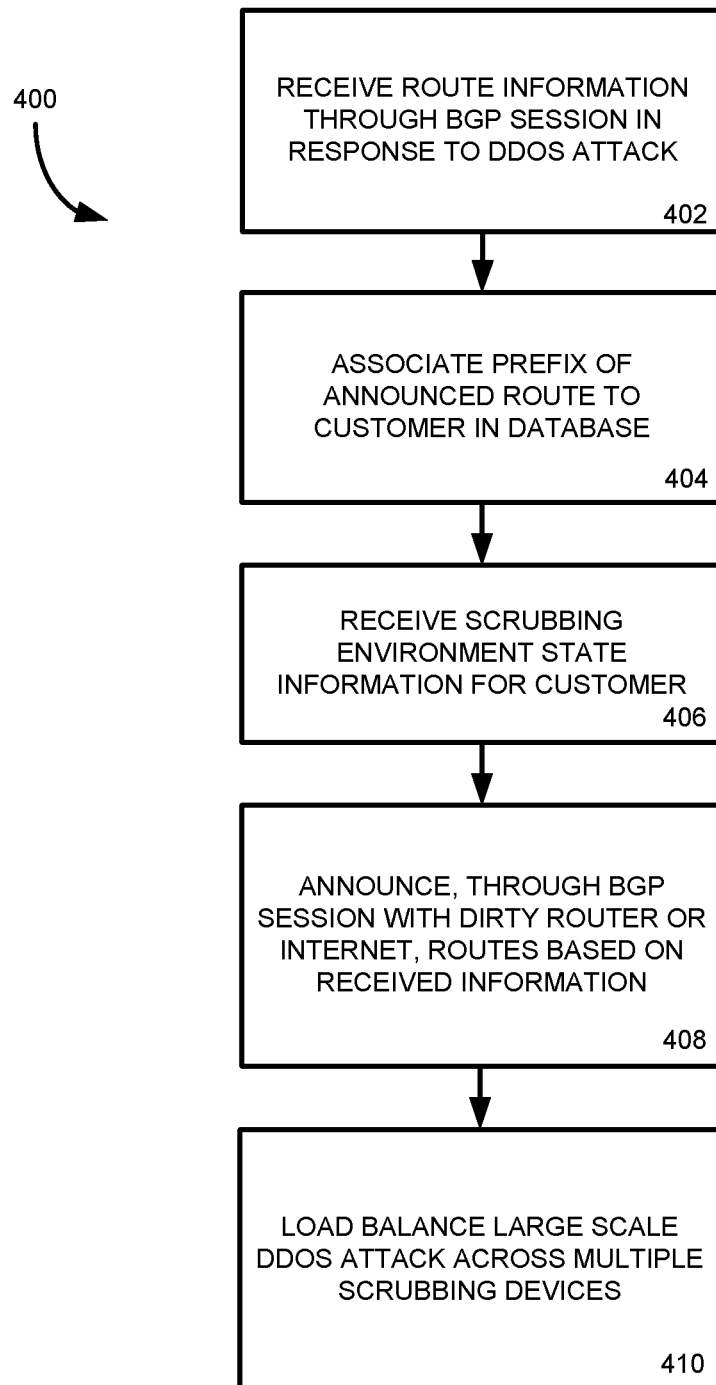
FIG. 4 is flowchart illustrating a method for utilizing a routing arbiter to automate control of a scrubbing service in a telecommunications network and to perform mitigation routing.

Through the method 300 of FIG. 3, the orchestrator 228 may automate scrubbing for a customer to the network 102 based on an advertised route by a customer device 226, thereby removing the manual provisioning or updating of the customer profile with the scrubbing environment 210. However, the orchestrator 228 in this embodiment receives the advertised route and relies on the other network components (i.e., clean router 220, scrubbing environment 210, and dirty router 208) to also advertise the BGP information to the Internet 204. In another embodiment, a route arbiter feature may be included in the orchestrator 228 to control the route announcement to the Internet 204 and provide additional scrubbing features to the customer device 226. In particular, FIG. 4 is flowchart illustrating a method 400 for utilizing a routing arbiter feature to automate control of a scrubbing service in a telecommunications network 102 and to perform mitigation routing. Similar to above, the operations of the method 400 may be performed by the orchestrator 228 of the network configuration 200. However, one or more of the operations may be performed by other networking or computing devices. Further, the orchestrator 228 may include more than one device for executing the operations of the method 400.

Beginning in operation 402 and similar to above, the orchestrator 228 receives routing information through a routing protocol advertisement. For example, the orchestrator 228 may receive a BGP session with routing information from the clean router 220 of the network 200. In other embodiments, the orchestrator 228 may receive the routing information from the VPN 224 or from the customer device 226 (or any other network device utilized in the network environment 200). The BGP or other routing protocol advertisement includes routing information for the customer device 226 in response to a detected DDOS attack on the customer device 226 or network and may include a newly announced route or a removal of a previously announced route to the customer device. In another embodiment, the route information may be received from one or more devices of the Internet 204 in response to a detected DDOS attack on the customer device 226 by one or more components of the network.

In operation 404, the orchestrator 228 associates the announced route with a customer identifier, such as through a database 230 or through information stored at a scrubbing controller 218 of the scrubbing environment 210. With the customer of the announced route identified, the orchestrator 228 may determine a customer profile state of the scrubbing environment 210 in operation 406. In one particular embodiment, the scrubbing controller 218 may provide customer profile state information to the orchestrator 228 such that the orchestrator may determine a customer scrubbing state. Further, the orchestrator 228 may utilize the received or determined customer scrubbing state to announce routing protocol information related to the customer device 226 or network and/or the scrubbing environment 210 in operation 408 through the route arbiter feature of the orchestrator.

The route arbiter function of the orchestrator 228 may be configured to announce routing information to network devices based on a received announced route in several ways. For example, the orchestrator 228 may set up a BGP sessions with the clean router 220, the scrubbing environment 210, and the dirty router 208 of the network 200. Although discussed herein with reference to a BGP routing protocol, any type of routing protocol announcements or advertisements may be utilized by the route arbiter of the orchestrator 228. In one instance, the orchestrator 228 receives the BGP route information from the clean router 220 over communication 232. The orchestrator 228 may then initiate, remove, or alter scrubbing of packets for the customer network 226 at the scrubbing environment 210 as explained above. Further, the orchestrator 228 may establish a BGP session 236 with the dirty router 208 to provide the announced route information to the dirty router. In turn, the dirty router 208 may announce the routing information to the Internet 204 or other associated network to begin receiving packets for the customer device 226. The route arbiter of the orchestrator 228 thereby removes the BGP route information propagation through the scrubbing environment 210 and also allows the orchestrator 228 to dynamically control mitigation routing of the scrubbing service by allowing for customer (based on announced routing information) to affect route preferences in the dirty router 208 and other devices via BGP routing methodologies.

In one instance, the orchestrator 228 may implement load balancing across the multiple scrubbing devices 212-216 of the environment 210 in response to a type or size of DDOS attack through the route arbiter feature. For example, the scrubbing controller 218 may assign particular customers of the network to particular scrubbing devices, such as scrubbing device A 212 for customer device 226. Once assigned, packets intended for scrubbing for the customer device 226 are sent to the assigned scrubbing device 212. During a large DDOS attack, however, the bandwidth of the scrubbing device 212 may be completely or mostly consumed by traffic intended for the customer device 226 such that other customer traffic assigned to that scrubbing device may be delayed or missed. By providing route information for the customer device 226 to the dirty router 208, and in particular a next-hop value in the BGP information identifying a particular scrubbing device 212-216 to utilize, the router arbiter of the orchestrator 228 may control which scrubbing device or devices are used to scrub traffic for the customer device. During a large DDOS attack, the orchestrator 228 may provide routing information that tells the dirty router 208 to transmit packets intended for customer device 226 to all of the scrubbing devices 212-216 in the scrubbing environment by providing next-hop values for all of the scrubbing devices for the particular route to the customer device in operation 410. The dirty router 208, in turn, may have routing logic that load balances the received packets to all scrubbing devices 212-216 such that no one scrubbing device is responsible to scrub all of the received traffic and minimize the likelihood of overwhelming on of the scrubbing devices. In previous instances, the dirty router 208 would follow the routing information provided by the clean router 220, which may result in transmitting all of the received traffic to a single scrubbing device 212. In this manner, the orchestrator 228 may utilize route announcements to the dirty router 208 to control the scrubbing of packets for customer device 226, in response to receiving route and attack information at the orchestrator.

In another example, the route arbiter of the orchestrator 228 may provide additional routing information not generally provided to the dirty router 208. For example, the orchestrator 228 may allow for the routes determined by the scrubbing controller 218 to be preferred, but such routes are modified by the orchestrator to include communities or an AS_PATH value of the customer device 226 announcement. By providing preferred customer routing information in the announced route to the dirty router 208, the orchestrator 228 may provide the customer device 226 control over how received packets are routed to the customer device through the network while also providing the scrubbing service in case of a DDOS attack. Further, this control over the routing of the packets may be implemented in the network dynamically such that such routes do not need to be providing to the scrubbing system 200 manually.

Figure 5:
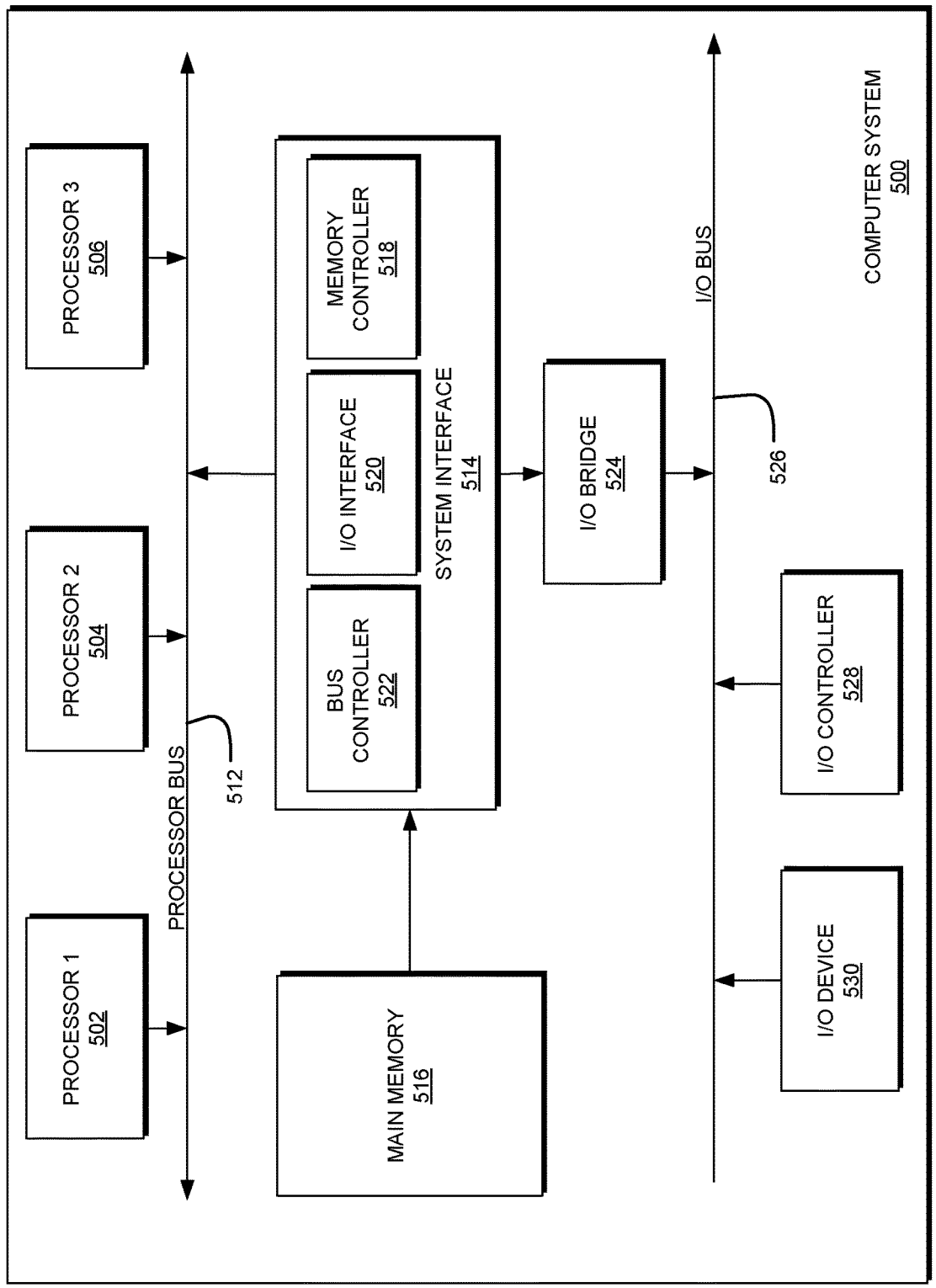
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the orchestrator 228 or scrubbing controller 218 discussed above, among other devices described. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated. The system interface 514 may further include a bus controller 522 to interact with processor bus 512 and/or I/O bus 526.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for providing a scrubbing service from a network, the method comprising:
   receiving routing information, at an application server, through a first routing protocol announcement session for a device of a telecommunications network in response to a denial of service attack on the device, the routing information comprising at least one Internet Protocol (IP) address associated with the device;
   associating the at least one IP address with a customer profile of a scrubbing environment of the telecommunications network, the scrubbing environment providing traffic scrubbing services to the customer of the telecommunications network; and
   transmitting one or more instructions from the application server to the scrubbing environment to add the at least one IP address to a list of scrubbed IP addresses of at least one scrubbing device of the scrubbing environment in response to the received routing information for the device of the telecommunications network through the first routing protocol announcement session,
   wherein the scrubbing environment comprises a scrubbing controller and a plurality of scrubbing servers, the scrubbing controller providing scrubbing instructions to the plurality of scrubbing servers to provide the traffic scrubbing services to the customer of the telecommunications network, and
   wherein the one or more instructions cause the scrubbing controller to remove the at least one IP address of the device from the list of scrubbed IP addresses of at least one scrubbing device of the scrubbing environment when the at least one IP address associated with the device is no longer announced from the device.

2. The method of claim 1 further comprising:
   accessing a database of customer information to the telecommunications network, the customer information comprising a plurality of IP addresses associated with each customer to the telecommunications network.

3. The method of claim 1 wherein the one or more instructions from the application server to the scrubbing environment further comprise a load balancing instruction to load balance the scrubbing service for the at least one IP address across the plurality of scrubbing servers.

4. An orchestrator device of a scrubbing environment of a telecommunications network, the orchestrator comprising:
   at least one communication port receiving routing information through a first routing protocol announcement in response to a detected denial of service attack on a device, the routing information comprising at least one Internet Protocol (IP) address associated with the device of the telecommunications network;
   a processing device; and
   a computer-readable medium connected to the processing device configured to store information and instructions that, when executed by the processing device, performs the operations of:
      associating the at least one IP address with a customer profile of the scrubbing environment of the telecommunications network, the scrubbing environment providing traffic scrubbing services to the customer of the telecommunications network;
      obtaining a customer scrubbing state of the scrubbing environment based at least on the customer profile of the scrubbing environment, the customer scrubbing state comprising an indication of a stored scrubbing state for the IP address associated with the device; and
      transmitting one or more instructions to the scrubbing environment to add the at least one IP address to a list of scrubbed IP addresses of at least one scrubbing device of the scrubbing environment in response to the received routing information for the device of the telecommunications network through the first routing protocol announcement,
   wherein the scrubbing environment comprises a scrubbing controller and a plurality of scrubbing servers, the scrubbing controller providing scrubbing instructions to the plurality of scrubbing servers to provide the traffic scrubbing services to the customer of the telecommunications network, and wherein the transmitted one or more instructions cause the scrubbing controller to remove the at least one IP address of the device from the list of scrubbed IP addresses of at least one scrubbing device of the scrubbing environment when the at least one IP address associated with the device is no longer announced from the device.

5. The orchestrator device of claim 4 wherein the transmitted one or more instructions further comprise a load balancing instruction to load balance the scrubbing service for the at least one IP address across the plurality of scrubbing servers.

6. A telecommunications network comprising:

a plurality of scrubbing devices providing traffic scrubbing services to at least one customer of the telecommunications network in response to a denial of service attack on a device of the customer;

a scrubbing controller providing scrubbing instructions to configure the plurality of scrubbing devices to provide the traffic scrubbing services to the at least one customer of the telecommunications network; and a scrubbing orchestrator in communication with the scrubbing controller, the scrubbing orchestrator:

receiving routing information through a first routing protocol announcement session for the device of the customer in response to the denial of service attack on the device, the routing information comprising at least one Internet Protocol (IP) address associated with the device;

associating the at least one IP address with a customer profile; and transmitting one or more instructions from an application server to the scrubbing controller to add the at least one IP address to a list of scrubbed IP addresses of at least one scrubbing device of the plurality of scrubbing devices in response to the received routing information through the first routing announcement protocol session, wherein a scrubbing environment comprises the scrubbing controller and a plurality of scrubbing servers, the scrubbing controller providing scrubbing instructions to the plurality of scrubbing servers to provide the traffic scrubbing services to the customer of the telecommunications network, and wherein the transmitted one or more instructions cause the scrubbing controller to remove the at least one IP address of the device from the list of scrubbed IP addresses of at least one scrubbing device of the scrubbing environment when the at least one IP address associated with the device is no longer announced from the device.

\* \* \* \* \*